United States Patent [19]

Eaton

[11] Patent Number: 4,714,991

[45] Date of Patent: Dec. 22, 1987

[54] MICROPROGRAM CONTROL APPARATUS HAVING VARIABLE MAPPING BETWEEN MICROINSTRUCTION CONTROL BITS AND GENERATED CONTROL SIGNALS

[75] Inventor: John R. Eaton, Salford, England

[73] Assignee: International Computers Limited, London, England

[21] Appl. No.: 697,484

[22] Filed: Feb. 1, 1985

[30] Foreign Application Priority Data

Feb. 21, 1984 [GB] United Kingdom ............... 8404480

[51] Int. Cl.⁴ .............................................. G06F 9/22
[52] U.S. Cl. .................................................. 364/200
[58] Field of Search ... 364/200 MS File, 900 MS File; 370/58, 112

[56] References Cited

U.S. PATENT DOCUMENTS

| | | | |
|---|---|---|---|
| 3,786,434 | 1/1974 | Frye et al. | 364/200 |
| 3,839,705 | 10/1974 | Davis et al. | 364/200 |
| 3,983,541 | 9/1976 | Faber et al. | 364/200 |
| 4,032,895 | 6/1977 | Lanza | 364/200 |
| 4,099,229 | 7/1978 | Kancler | 364/200 |
| 4,187,539 | 2/1980 | Eaton | 364/200 |
| 4,251,862 | 2/1981 | Murayama | 364/200 |
| 4,409,683 | 10/1983 | Woodward | 370/112 |
| 4,467,415 | 8/1984 | Ogawa | 364/200 |
| 4,631,663 | 12/1986 | Chilinski | 364/200 |
| 4,633,390 | 12/1986 | Yoshida | 364/200 |

Primary Examiner—Raulfe B. Zache
Assistant Examiner—Florin Munteanu
Attorney, Agent, or Firm—Lee, Smith & Zickert

[57] ABSTRACT

A data processing apparatus, which includes a microprogram control unit for producing control signals for the apparatus. Each microinstruction contains a number of control bits, and an address field. The address field addresses a control memory so as to read out a control word. Each control word specifies the way in which the control signals are mapped on to the control bits of the microinstruction. The output of the control memory controls switching logic which connects the control bits to the specified control signal lines. This variable mapping of the control signals allows the control signals to be packed into any available space in the microinstruction, thus reducing the required number of bits in the microinstruction without any significant loss of flexibility. Certain critical control signals however are derived from fixed positions in the microinstruction so as to avoid delays. These critical control signals are confirmed by validity signals from the control memory.

9 Claims, 7 Drawing Figures

MICROPROGRAM CONTROL APPARATUS HAVING VARIABLE MAPPING BETWEEN MICROINSTRUCTION CONTROL BITS AND GENERATED CONTROL SIGNALS

This invention relates to microprogram control. It is well known to control the operation of data processing or other apparatus by means of a microprogram, held in a microprogram store. The microprogram consists of a number of microinstructions, each of which defines a set of elementary operations to be performed by the apparatus. Each microinstruction is read out of the store in turn, and is used to generate the appropriate control signals to carry out those elementary operations.

In one known form of microprogram control (sometimes referred to as horizontal microprogramming) the individual bits of the microinstruction correspond directly to the respective control signals. The control signals can therefore be derived directly from the microinstruction, since there is a fixed one-to-one mapping between the bits of the microinstruction and the control signals. However, this approach usually results in very large microinstructions, and hence is very costly in terms of storage requirements. For example, if the apparatus requires a hundred different control signals, each microinstruction must be a hundred bits wide.

The usual way of reducing microprogram storage requirements is to encode microinstructions by combining mutually exclusive sets of control signals into the same field of the microinstruction. For example, if it is known that four control signals are mutually exclusive (i.e. no two of them can ever occur simultaneously) it is possible to encode these four signals in a two-bit field. When the microinstruction is executed, the two-bit field is decoded to produce one of the four control signals.

However, a disadvantage of this encoding technique is that it requires the designer of the system to identify the mutually exclusive combinations of control bits, which may be difficult in practice. Moreover, once the designer has settled on a particular encoding scheme, it is very difficult to modify it to incorporate changes in the microinstruction set.

The object of the present invention is to provide a way of reducing the width of microinstructions without the above disadvantages.

SUMMARY OF THE INVENTION

According to the invention there is provided a microprogram control unit for producing control signals on a plurality of control signal lines, the unit comprising a microprogram store holding a plurality of microinstructions and a sequence controller for reading out a sequence of microinstructions from the microprogram store, wherein each microinstruction comprises an address field and a plurality of control bits, the address field is connected to the address input of a control word memory which holds a plurality of control words each of which specifies a particular set of correspondences between the control bits and the control signal lines, and the output of the control word memory is used to control switching logic so as to connect the control bits to the control signal lines as specified by the addressed control word.

The invention thus provides a variable mapping (i.e. set of correspondences) between the bits of the microinstruction and the control signals, such that a particular bit or field of the microinstruction can act as the source for different control signals, and a particular control signal can be derived from various different positions in the microinstruction, depending on the value of the control word. As will be shown, this allows the microinstruction to be considerably smaller than it would have been if a fixed one-to-one mapping had been used, yet without any significant loss in flexibility i.e. the ability to specify different combinations of control signals within a single microinstruction.

The invention is particularly applicable to the case of a microprogram control unit for a pipeline processor, consisting of a series of stages which operate in an overlapped manner. In such a system, the control signals for the early stages of the pipeline are preferably derived directly from fixed positions of the microinstruction, control signals for the later stages of the pipeline being derived from variable positions in the microinstruction by the switching logic. This ensures that the control signals for the early stages are available without any delay, so avoiding any reduction in operation speed as a result of the operation of the switching logic.

BRIEF DESCRIPTION OF THE DRAWINGS

One embodiment of the invention will now be described by way of example with reference to the accompany drawings.

DESCRIPTION OF THE EMBODIMENT OF THE INVENTION

Figure 1:
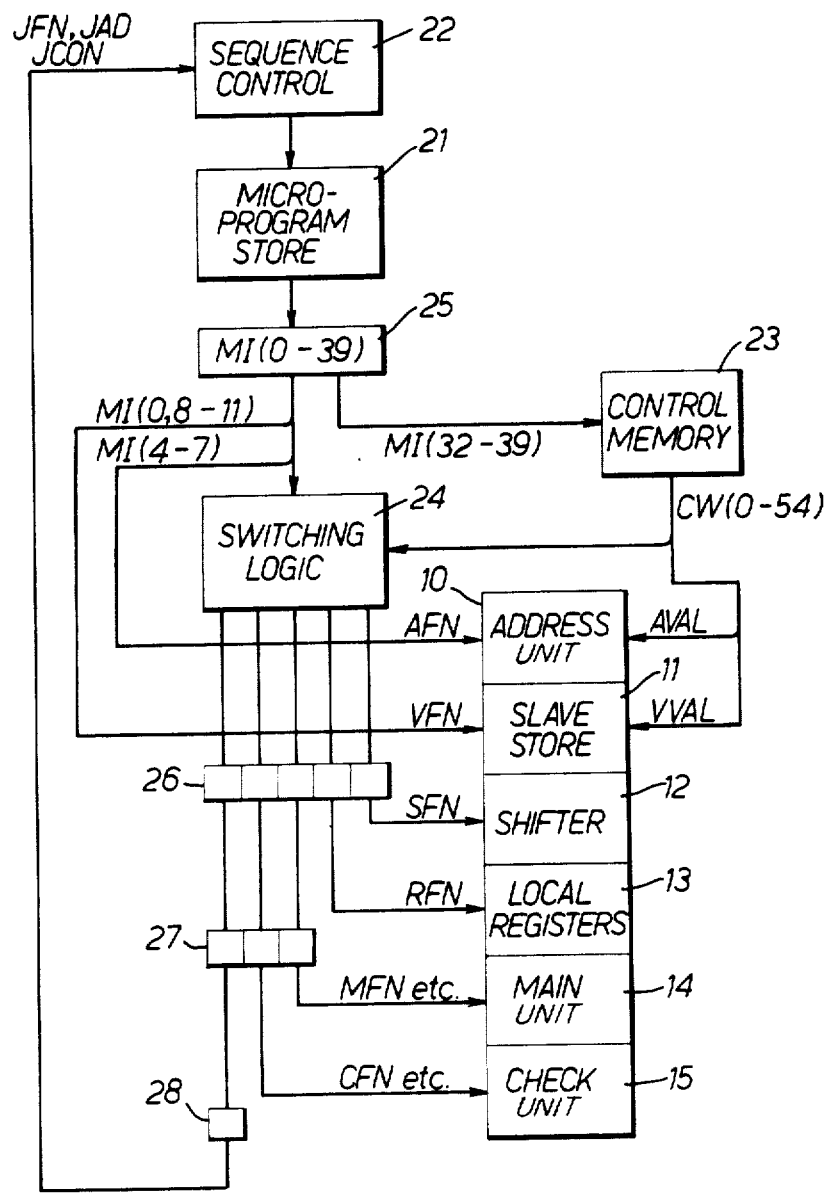
FIG. 1 is a schematic block diagram of a microprogram-controlled pipelined data processor.

Referring to FIG. 1, the processor comprises a plurality of functional units, including an address unit 10, a slave store 11, a shifter unit 12, a set of local registers 13, a main unit 14, and a check mill 15.

Figure 2:
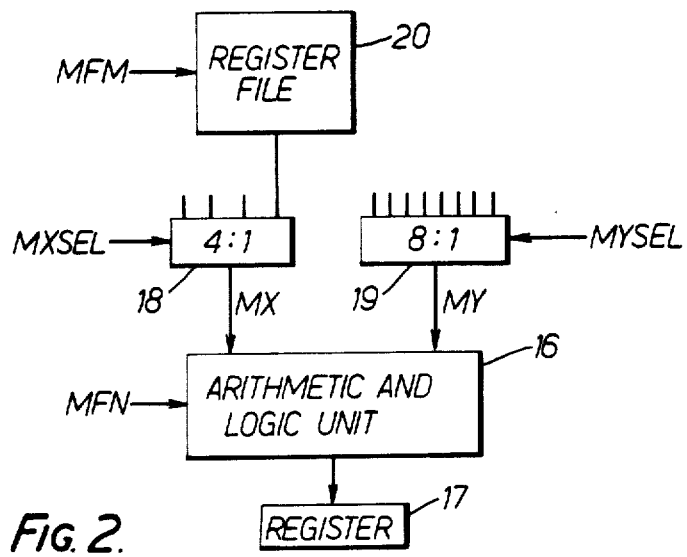
FIG. 2 shows a main unit forming part of the data processor.

The main unit 14 is shown in more detail in FIG. 2. The function of this unit is to perform the main arithmetic and logical calculations in the processor. It consists of an arithmetic and logic unit 16 having two inputs MX and MY, and an output register 17. The unit 16 is capable of performing up to 32 different operations on its two inputs, such as ADD, SUBTRACT, AND, OR and so on. The operation to be performed is specified by a five-bit function control signal MFN.

The input MX is selected by a 4:1 multiplexer 18, controlled by a two-bit control signal MXSEL. Similarly, the input MY is selected by an 8:1 multiplexer 19, controlled by a three bit control signal MYSEL.

One of the inputs to the multiplexer 18 is from a 32-word register file 20, which is addressed by a 5-bit control signal MFM. The other inputs of the multiplexers 18,19 are connected to the outputs of the functional units 10-15 so as to receive operands from various sources. The contents of the output register 17 are, in turn, available for input to other units.

The check unit 15 is identical to the main unit, having corresponding control signals CFN, CFM, CYSEL and CXSEL. The function of the check unit is to perform operational checks such as testing whether a particular address is greater than a specified limit. The check unit shares access to the same register file 20 as the main unit.

The function of the address unit 10 is to perform arithmetic operations necessary for generating addresses, such as adding a displacement value to a base value. Because it has a more limited function, the address unit is somewhat simpler in form than the main, unit, and requires only a 4-bit control signal AFN.

The slave store 11 acts as a fast access buffer, holding copies of operands, instructions and addresses currently in use by the processor. It is addressed by the output of the address unit 10, and also receives a 5-bit control signal VFN. If the required information is not present in the slave store, an interrupt signal is generated to cause the information to be fetched from a main store (not shown).

The shifter unit 12 performs shift operations on operands and addresses. It is controlled by a 16-bit control signal SFN, which specifies the type of shift (e.g. right or left), and the number of places the data is to be shifted.

The local registers 13 are controlled by a 10-bit control signal RFN.

Further details of the construction of the units 10–15 and the interconnections between them form no part of the present invention, and they may all be of conventional form.

The processing unit may also require other control signals for various purposes, such as enabling interrupts, or controlling writes to the register file and local registers. However, for simplicity, these will not be described herein.

Microprogram Control Unit

The control signals for the functional units 10–15 are all obtained from a microprogram control unit, comprising a microprogram store 21, a sequence control unit 22, a control word memory 23, and a switching logic unit 24.

The microprogram store 21 has 16,384 (16K) locations, each of which can hold a 40-bit microinstruction MI (0–39). The microprogram store is addressed by the sequence control unit 22, which determines the order in which the microinstructions are read out for execution.

Jumps in the microinstruction sequence are specified by three control signals JCON, JFN and JAD. JCON is a 7-bit signal indicating the condition upon which the jump is to occur; JFN is a 3-bit signal specifying the type of jump; and JAD is a 16-bit signal specifying the jump destination address i.e. the location of the microprogram store to which a jump is to be made if the specified condition is satisfied.

Each microinstruction read out of the microprogram store is held in a microinstruction register 25.

The first four bits MI(0–3) of each microinstruction are used as the sources for four out of a set of fifteen single-bit control signals OS(1–15). The next 28 bits MI (4–31) provide seven 4-bit fields MI(4–7), MI(8–11)---MI(28–31), and are used as the sources of groups of control signals, as will be described.

The last eight bits MI(32–39) provide an address field which is used to address the control word memory 23. The memory 23 has 256 locations, each of which can hold a 64-bit control word CW(0–63). Each control word specifies a particular mapping (i.e. set of correspondences) between the bits of of the microinstruction MI(0–31) and the control signals. In particular, as will be described in more detail later, some of the bits of the control word specify which of the 4-bit fields MI(4–7)---MI(28–31) are to act as the source for particular groups of control signals; other bits of the control word specify which of the fifteen single-bit control signals OS(1–15) are to be supplied by the control bits MI(0–3).

Bits CW(0–54) of the control word from the memory 23 are applied to the switching logic 24. This unit switches the control bits and control fields of the microinstruction so as to connect them to the specified control lines. The switching logic unit 24 is described below in greater detail with reference to FIGS. 3–6.

The least significant bits CW(55–63) of the control word are used as parity check bits for the control word, to detect any errors in the control store.

Pipeline structure

The data processor operates as a six-stage pipeline, in which each microinstruction is fetched and executed in up to six clock beats. The six stages of the pipeline are as follows.

Stage 1 is the sequence control unit 22.

Stage 2 is the microprogram store 21.

Stage 3 contains the address mill 10, the control word memory 23 and the switching logic unit 24. Also, the controls for the slave store 11 are set up in this stage.

Stage 4 contains the shifter 12 and the local registers 13. Reads from the slave store take place at this stage.

Stage 5 contains the main unit 14 and check unit 15. Writes to the slave store take place at this stage. Stage 6 includes the jump controls; writes to the register file 20 and the local registers 13 also take place at this stage.

The fetching and execution of successive microinstructions is overlapped in the pipeline, so that up to six different microinstructions may be active in the processor at the same time. Pipelined processors are well known in the art and so it is not necessary to describe the action of the pipeline in greater detail.

The control signal AFN for the address unit 10 is derived directly from bits MI(4–7) of the microinstruction, and the control signal VFN for the slave store is derived directly from bits MI(0) and MI(8–11). This ensures that the address unit and slave store receive their control signals as soon as the microinstruction appears in the register 25. This is necessary since, as described above, the address unit and slave store operate at stage 3 of the pipeline and hence must receive their control signals from stage 2 without any delay. The address unit 10 is supplied with a validity signal AVAL derived from bit CW(27) of the control word. When AVAL is true, this indicates that the control signal AFN is valid. However, when AVAL is false, this indicates that no address unit operation is required and that the control signal AFN is invalid. The operation of the address unit is therefore inhibited, and the field MI(4–7) is available to act as the source for other control signals.

Similarly, the slave store 11 has a validity signal VVAL derived from bit CW(31).

The control signals for stages 4–6 of the pipeline are obtained from the switching logic unit 24, and are fed into a pipeline of registers 26,27,28 which ensures that stages 4–6 receive their control signals at the appropriate clock beats. For example, the control signal MFN passes through two successive pipeline registers 26,27 and is made available to the main unit 14 at stage 5 of the pipeline.

Switching logic

The switching logic unit 24 will now be described in detail with reference to FIGS. 3-6.

Single-bit control signals OS(1-15)

Figure 3:
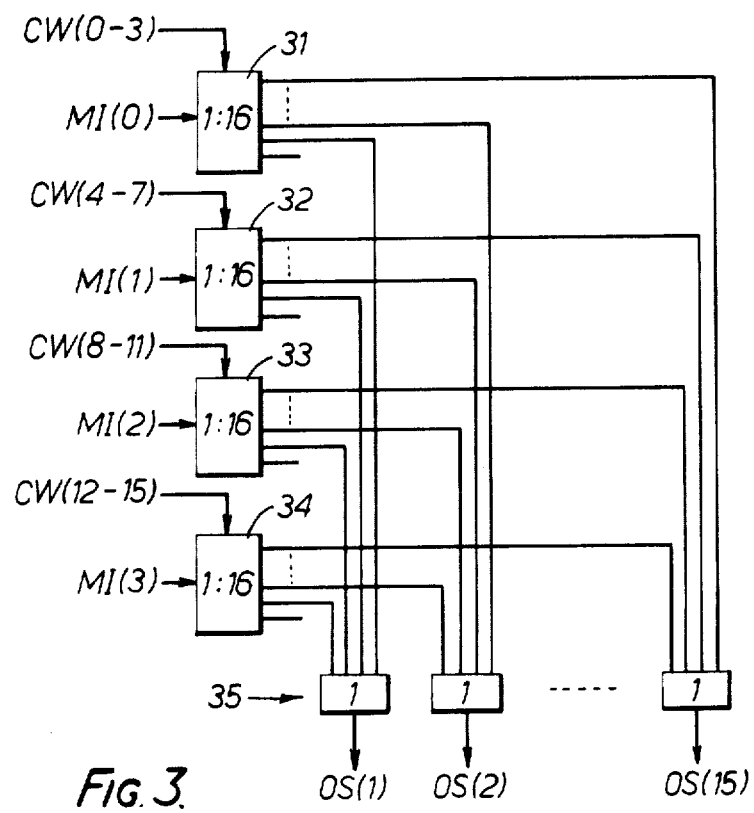
FIG. 3 shows a switching logic circuit which generates single-bit control signals for the processor.

It was mentioned above that the four bits MI(0-3) act as sources for fifteen single-bit control signals OS(1-15). The way in which these signals are selected is shown in FIG. 3.

Bits MI(0-3) are applied to the data inputs of four 1:16 demultiplexers 31-34. The control inputs of these demultiplexers are connected respectively to the fields CW(0-3), CW(4-7), CW(8-11) and CW(12-15) from the control word. The first output of each demultiplexer (corresponding to the control input being equal to zero) is not used, while the remaining fifteen outputs are connected respectively to fifteen OR gates 35. These OR gates produce the single-bit control signals OS(1-15) as shown.

Thus, each of the bits MI(0-3) can be selected as the source of any one of the control bits OS(1-15). For example, MI(0) can be selected as the source of OS(i) by setting the field CW(0-3) equal to i. Those control bits which are not supplied with values in this way have the default value zero.

Main unit controls

Figure 4:
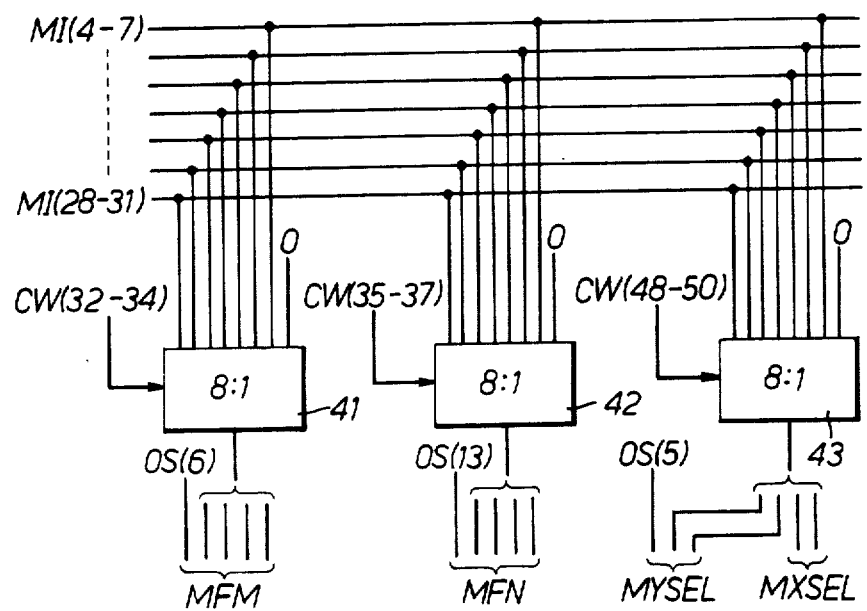
FIG. 4 shows a switching logic circuit which generates control signals for the processor.

Referring to FIG. 4, this shows the way in which the control signals MFM, MFN, MYSEL and MXSEL for the main unit 4 are selected.

The most significant bit of MFM is provided by the single-bit control signal OS(6), derived as shown in FIG. 3. Thus, this bit can come from any of the four bits MI(0-3)

The other four bits of MFM are obtained from an 8:1 multiplexer 41, controlled by the field CW(32-34). The first input of the multiplexer, selected when CW(32-34) has the value 0000, is connected to zero logic level. This input is selected when the control signal MFM is to have a null value. The remaining seven inputs of the multiplexer 41 are connected respectively to the seven 4-bit fields MI(4-7)---MI(28-31) of the microinstruction. Thus, these four bits of MFM can be selected from any of the 4-bit fields of the microinstruction.

Similarly, the most significant bit of MFN is supplied by the signal OS(13) and the other four bits are selected from one of the seven 4-bit fields of the microinstruction by an 8:1 multiplexer 42, controlled by CS(35-37). The most significant bit of MYSEL is supplied by OS(5), while the other two bits of MYSEL and the two bits of MXSEL are selected from one of the 4-bit fields of the microinstruction by an 8:1 multiplexer 43, controlled by CW(48-50).

Check unit controls

The control signals CFM, CFN, CYSEL and CXSEL for the check unit 15 are produced in a similar manner, from the control signals OS(8), OS(14) and OS(7) and from three multiplexers (not shown) controlled respectively by CW(40-42), CW(43-45) and CW(51-53).

Local register controls

Figure 5:
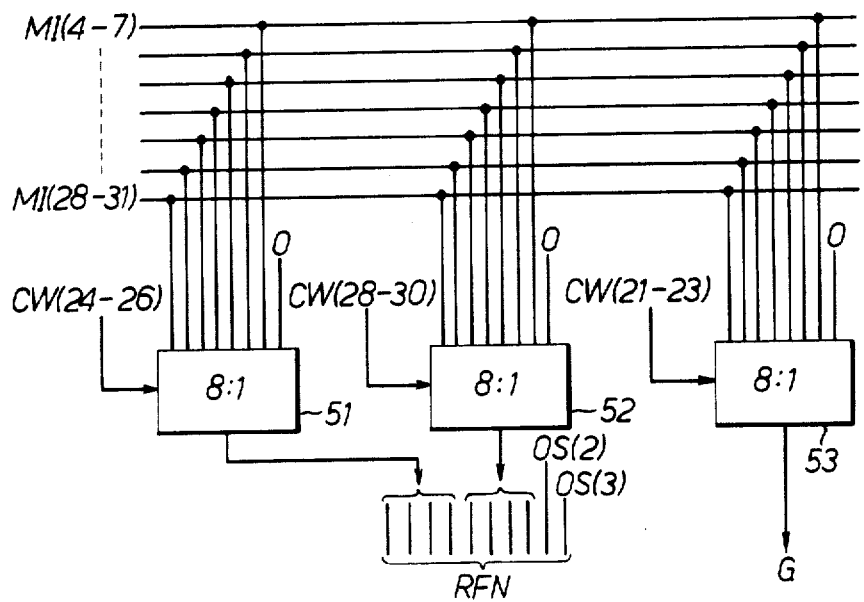
FIG. 5 shows a switching logic circuit which generates a local register control signal.

Referring now to FIG. 5, this shows how the local register control signal RFN is produced.

RFN has ten bits, and is formed from two 4-bit fields of the microinstruction along with two odd bits supplied by OS(2,3). The two 4-bit fields are selected by a pair of 8:1 multiplexers 51,52, controlled respectively by CW(24-26) and CW(28-30) in a similar manner to the multiplexers 41-43. Thus, it can be seen that RFN can be supplied by any two of the single bits MI(0-3) and any two of the four bit fields MI(4-7)---MI(28-31).

Jump controls

Figures 6, 7:
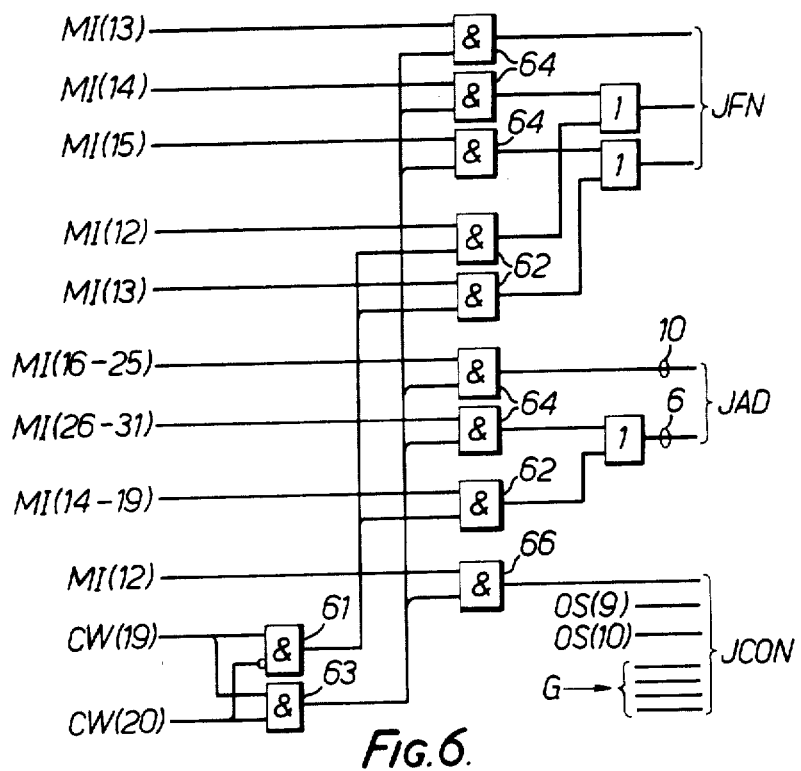
FIG. 6 shows a logic circuit which generates jump control signals for the processor.
FIG. 7 shows th fields of the microinstruction which can act as sources for various control signals and also shows some examples of possible microinstructions.

FIG. 6 shows the way in which the jump control signals JFN, JAD and JCON are produced.

The jump control signals have two possible formats, according to the values of the two bits CW(19,20), as follows:

| CW(19,20) | Source of JFN & JAD |
|---|---|
| 1 0 | MI(12-19) |
| 1 1 | MI(13-31) |

Thus, depending on which format is used, the signals JFN and JAD occupy either two or five 4-bit fields of the microinstruction. When the shorter format is used, the unused 3 fields are available to act as sources for other control signals.

Any other values of CW(19,20) indicate that no jump function is required, and both the signals JNF and JAD are forced to zero. All the bits MI(12-31) are then available as the source for other control signals.

As shown in FIG. 6, the shorter format is detected by an AND gate 61, which enables a set of AND gates 62. This causes the least significant two bits of JFN to be selected from MI(12,13), the most significant bit being zero. It also causes the least significant six bits of JAD to be selected from MI(14-19), the most significant bits being zero.

The longer format is detected by an AND gate 63 which enables a set of AND gates 64. This causes the three bits of JFN to be selected from MI(13-15) and the sixteen bits of JAD to be selected from MI(16-31).

The four least significant bits of JCON are supplied by a field G which is derived from an 8:1 multiplexer 53 (FIG. 5), controlled by the bits CW(21-23). The inputs to (FIG. 5), controlled by the bits CW(21-23). The inputs to this multiplexer are connected in a similar manner to the multiplexers 51, 52 (FIG. 5). Hence, any one of the four-bit fields MI(4-7)---MI(28-31) can be selected as the source for the field G. If the microinstruction is not a jump, CW(21-23) is set to zero, and so the multiplexer 53 will select the null input.

The next two bits of JCON are provided by the control signals OS(9,10).

The most significant bit of JCON is supplied by an AND gate 66. It is zero for the short format, and equal to MI(12) in the long format.

Shifter controls

The shifter control signals SFN have four possible formats according to the value of the three bits CW(16-18), as follows.

| CW(16-18) | Source of SFN |
|---|---|
| 1 1 1 | MI(16-31) |
| 1 1 0 | MI(20-31) |
| 1 0 1 | MI(24-31) |
| 1 0 0 | MI(28-31) |

Depending on which format is used, the shift control signals occupy 4,3,2 or 1 of the four-bit fields of the microinstruction. When the shorter formats are used, the unused fields are, of course, available to act as sources for other control signals. instruction is not a shift. The values of all the shift control signals are forced to zero and all the bits MI(16-31) are available as sources for other control signals.

It is not necessary for an understanding of the invention to describe the action of the shift control signals. The logic for selecting the different formats may be similar to that described for selecting the different jump formats.

Summary

By way of summary of the above description, FIG. 7 shows the possible sources of the various control signals. (The single bit control signals are ignored for simplicity).

As indicated by the letter A, the control signal AFN for address unit can be obtained only from the field MI(4-7). Similarly, as indicated by V, the control signal VFN for the slave can be obtained only from the field MI(8-11).

As indicated by the letter J, the jump control signals have two possible formats, but within each format they are derived from fixed fields of the microinstruction. Similarly, as indicated by S, the shift control signals have four possible formats, but within each format they are derived from fixed fields.

In contrast, the control signals for the main unit, check unit, local registers, and the G-field of the jump control, can be derived from any of the seven fields MI(4-7)—MI(28-31). These control signals can therefore be packed into any available space in the microinstruction.

As a result, there are many possible ways of mapping the control signals on to the microinstruction bits to produce a single microinstruction which performs a combination of different operations. By way of example, FIG. 7 shows schematically four possible microinstructions (a)-(d).

Microinstruction (a) performs an address unit operation (A), a slave store function (V), a main unit operation (M) and a shift function (S).

Microinstruction (b) performs an address unit operation (A), a main unit operation (M) and a shift function (S). It will be seen that, since no slave function (V) is required, the field MI(8-11) has been used as the source of other control signals. In this case, only two fields (M) are used for controlling the main unit: the remaining control signals for the main unit have the default value zero.

Microinstruction (c) is a jump microinstruction using the long format, and also including a slave store function. the jump control signal, is derived from the available field MI(4-7).

Microinstruction (d) is a jump microinstruction using the short format, which also includes a slave store function (V) and a main unit operation (M). It should be observed that the three fields for the main unit need not necessarily be obtained from adjacent fields of the microinstruction: they can be obtained from any available field. Also, it should be noted from this example that a given control signal (such as the G-field) can be derived from different sources in different microinstructions.

Each of these mappings of the control bits on to the microinstruction would be represented by a unique control word CW in the control store 23, and there could be up to 256 different mappings specified. It should be noted that any control signals which are not specified in the microinstruction, such as the check-unit controls in the above example, are given a default value, usually zero.

If the control signals had been mapped on to the microinstruction using a fixed one-to-one mapping as in the prior art, this would have required the following numbers of bits in the microinstruction:

| Control | bits |
|---|---|
| address unit | 4 |
| slave store | 5 |
| shifter | 16 |
| local registers | 10 |
| main unit | 15 |
| check unit | 15 |
| jumps | 26 |
| total | 91 |

Thus, in this particular example, the number of bits in the microinstruction has been reduced from 91 to 40, compared with the fixed mapping arrangements. This compression of the microinstruction is achieved without any significant loss of flexibility. This is because of the variable mapping of the control signals for the main unit, check unit, local registers, and the G-field for the jump control, which can be derived from any available fields, thus making efficient use of the microinstruction.

Microcode compilation

The control words CW in the control memory 23 and the microprogram in the microprogram store 21 could be written manually. However, in practice this would be extremely complex and time consuming. Therefore, the microprogram would normally be written using mnemonic codes indicating the desired elementary operations to be performed by each microinstruction. The microprogram would then be processed by a compiler, so as to generate the actual object codes for the microinstructions and at the same time to generate a table of control words for loading into the control memory 23.

The compiler operates as follows. Each mnemonic microinstruction is scanned in turn, to determine which control signals are specified by it. The table of control words is then scanned to determine whether a suitable control word already exists to allow these control signals to be obtained from the microinstruction. If not, a suitable control word is generated and placed in a free location of the table. The object code of the microinstruction is then generated by inserting the desired values of the control signals into the corresponding locations of the microinstruction.

Occasionally the compiler may find that it is impossible to pack all the desired control signals into a single microinstruction. For example, it is not possible to have a microinstruction which performs a jump, using the full jump format, and at the same time performs a main unit function using all the unit control signals, since this would require nine 4-bit fields whereas the microinstruction has only seven such fields. The compiler would therefore produce a print-out informing the programmer that it is impossible to compile this microinstruction, and the programmer would then have to re-write this section of the microprogram, e.g. by splitting the offending microinstruction into two separate microinstructions.

The compiler forms no part of the present invention and therefore will not be described in further detail.

What is claimed is:

1. A microprogram control unit for producing control signals on a plurality of control signal lines, the unit comprising:
   (a) a microprogram store for holding a plurality of microinstructions each comprising an address field and a plurality of control bits,
   (b) a control word memory for holding a plurality of control words each of which specifies a particular set of correspondence between the control bits and the control signal lines,
   (c) means for reading out a microinstruction from the microprogram store and utilizing the address field of that microinstruction to address the control word memory, thereby reading out one of the control words, and
   (d) switching means responsive to the control word from the control word memory, for connecting the control bits of the microinstruction read from the microprogram store to selected control signal lines as specified by the control word.

2. A unit according to claim 1 wherein the control signal lines comprise a plurality of groups, and the control bits of each microinstruction are organized into a smaller plurality of control fields, and wherein each control word specifies a set of correspondences between said control fields and said groups.

3. A unit according to claim 2 wherein the switching means comprises a plurality of multiplexers each of which has an output connected to a respective group of control signal lines, each multiplexer having a plurality of inputs connected to the respective control fields of the microinstruction.

4. A unit according to claim 2 wherein each of said control fields can be connected to any one of said groups of control signal lines.

5. A unit according to claim 2 wherein each microinstruction, in addition to said control fields, also includes a plurality of individual control bits, and the control signal lines include a plurality of individual control lines, and wherein each control word also specifies a set of correspondences between the individual control bits and the individual control lines.

6. A unit according to claim 5 wherein the switching means includes a plurality of OR gates each having an output connected to a respective one of said individual control lines, and a plurality of demultiplexers each having an input connected to a respective one of said individual control bits and a plurality of outputs respectively connected to the OR gates.

7. A unit according to claim 1 wherein some of the control bits of the microinstruction are directly connected to predetermined control lines.

8. A unit according to claim 7 wherein each control word contains at least one validity bit for indicating the validity of signals on said predetermined control lines.

9. A data processing apparatus comprising:
   (a) a plurality of functional units which process a sequence of microinstructions in an overlapped manner, the units including a first stage unit which processes one phase of each microinstruction and further stage units which process subsequent phases of each microinstruction,
   (b) a first set of control signal lines for controlling the first stage unit and a second set of control signal lines for controlling the further stage units,
   (c) a microprogram store for holding a plurality of microinstructions each comprising an address field and a plurality of control bits,
   (d) a control word memory for holding a plurality of control words each of which specifies a particular set of correspondences between the control bits and the second set of control signal lines,
   (e) means for reading out a microinstruction from the microprogram storing and utilizing the address field thereof to address the control word memory, thereby reading out one of the control words,
   (f) means for applying a predetermined plurality of the control bits of the microinstruction read from the microprogram store to the first set of control signal lines, and
   (g) switching means responsive to the control word from the control word memory, for connecting the control bits of the microinstruction read from the microprogram store to the control signal lines of the second set as specified by the control word.

* * * * *